US010788416B2

(12) United States Patent
Butcher et al.

(10) Patent No.: US 10,788,416 B2
(45) Date of Patent: Sep. 29, 2020

(54) MULTIPLE WAVELENGTH LIGHT SOURCE FOR COLORIMETRIC MEASUREMENT

(71) Applicant: Rosemount Analytical Inc., Irvine, CA (US)

(72) Inventors: Bradley A. Butcher, La Verne, CA (US); Chang-Dong Feng, Long Beach, CA (US)

(73) Assignee: Rosemount Inc., Shakopee, MN (US)

( * ) Notice: Subject to any disclaimer, the term of this patent is extended or adjusted under 35 U.S.C. 154(b) by 95 days.

(21) Appl. No.: 14/502,425

(22) Filed: Sep. 30, 2014

(65) Prior Publication Data
US 2015/0099303 A1    Apr. 9, 2015

Related U.S. Application Data

(60) Provisional application No. 61/886,291, filed on Oct. 3, 2013.

(51) Int. Cl.
*G01N 33/18* (2006.01)
*G01N 21/25* (2006.01)
(Continued)

(52) U.S. Cl.
CPC ........... *G01N 21/251* (2013.01); *G01N 21/27* (2013.01); *G01N 21/78* (2013.01); *G01N 31/22* (2013.01); *G01N 21/3151* (2013.01)

(58) Field of Classification Search
CPC ...... G01N 21/251; G01N 21/27; G01N 21/78; G01N 31/22
See application file for complete search history.

(56) References Cited

U.S. PATENT DOCUMENTS

2003/0058450 A1    3/2003   Mosley et al.
2005/0272985 A1*  12/2005   Kotulla ............. A61B 5/14503
                                                          600/309
(Continued)

FOREIGN PATENT DOCUMENTS

CN    1578903 A    2/2005
CN    1774625 A    5/2006
(Continued)

OTHER PUBLICATIONS

Patent Examination Report No. 1 for Australian Patent Application No. 2014329517 dated Aug. 1, 2016, 2 pages.
(Continued)

*Primary Examiner* — Brian R Gordon
*Assistant Examiner* — Dwan A Gerido

(57) ABSTRACT

A colorimetric wet chemistry analyzer for determining a concentration of an analyte of interest in a sample is provided. The analyzer comprising includes a reaction chamber configured to receive the sample and facilitate a reaction that changes a color of the sample based on the concentration of the analyte of interest. A photometric cell is operably coupled to the reaction chamber to receive the sample and direct illumination therethrough. The photometric cell has a first illumination source configured to provide illumination at a first wavelength through the photometric cell and a second illumination source configured to provide illumination at a second wavelength through the photometric cell. The second wavelength is different than the first wavelength. A photo detector is configured to detect illumination passing through the photometric cell. A controller is coupled to the first illumination source, the second illumination source and the photo detector and is configured to provide an indication of concentration relative to the analyte of interest based on a signal from the photo detector.

7 Claims, 5 Drawing Sheets

(51) Int. Cl.
- *G01N 21/27* (2006.01)
- *G01N 31/22* (2006.01)
- *G01N 21/78* (2006.01)
- *G01N 21/31* (2006.01)

(56) References Cited

U.S. PATENT DOCUMENTS

| | | | |
|---|---|---|---|
| 2007/0037289 A1 | 2/2007 | Matschenko et al. | |
| 2010/0196945 A1* | 8/2010 | Forsell | G01N 15/05 435/29 |
| 2011/0058984 A1* | 3/2011 | Sasaki | G01J 1/32 422/62 |
| 2011/0194114 A1* | 8/2011 | Yeo | B01L 3/5027 356/435 |

FOREIGN PATENT DOCUMENTS

| | | |
|---|---|---|
| EP | 2034290 A2 | 3/2009 |
| EP | 2013079619 A1 | 6/2013 |
| JP | 2003098092 A | 4/2003 |
| JP | 2007-071139 * | 9/2008 |
| JP | 2008232747 A | 10/2008 |
| WO | WO 2013-079619 A1 | 6/2013 |

OTHER PUBLICATIONS

First Office Action for Chinese Patent App No. 2014800043019 dated Sep. 5, 2016, 18 pages with English Translation.
International Search Report and Written Opinion for International Application No. PCT/US2014/058782, dated Feb. 24, 2015, date of filing: Oct. 2, 2014, 13 pages.
Supplementary European Search Report for European Patent Application No. 14851348.4, dated Feb. 10, 20117, 8 pages.
Office Action for Canadian Patent Application No. 2,926,202, dated Mar. 20, 2017, 3 pages.
Second Office Action for Chinese Patent Application No. 2014800043039, dated May 2, 2017, 25 pages including English Translation.
Third Office Action for Chinese Patent Application No. 201460004303.9, dated Nov. 1, 2017, 10 pages.
Office Action dated May 28, 2018, for Canadian Patent Application No. 2926202, 4 pages.
Fourth Office Action dated May 29, 2018, for Chinese Patent Application No. 201480004303.9, 22 pages including English translation.
Fifth Office Action dated Dec. 27, 2018 for Chinese Patent Application No. 201480004303.9, 19 pages including English Translation.
EPO Communication Pursuant to Article 94(3), dated Oct. 16, 2018, 6 pages.
Ellis, S.P., "The Measurement of Silica", Jun. 2009, 6 pages.
Rejection Decision dated Apr. 3, 2019 for Chinese Patent Application No. 201480004303.9, 22 pages including English translation.
EPO Communication pursuant to Article 94(3) EPC, dated Mar. 26, 2019, for European Patent Application No. 14851348.4, 6 pages.
"On-Line Silica Analyzer", Model CFA3030, PDS 71-Silica3030/rev.E, Product Data Sheet, Rosemount Analytical, Emerson Process Management, Jan. 2014, 4 pages.
"ABB Navigator 600 silica analyzer, Combined cycle power plant boilers", ABB, Date Unknown, 3 pages.

* cited by examiner

MULTIPLE WAVELENGTH LIGHT SOURCE FOR COLORIMETRIC MEASUREMENT

CROSS-REFERENCE TO RELATED APPLICATION

The present application is based on and claims the benefit of U.S. Provisional Patent Application Ser. No. 61/886,291, filed Oct. 3, 2013, the content of which is hereby incorporated by reference in its entirety.

BACKGROUND

Online wet chemistry analyzers are used in a variety of industries to provide a continuous indication of an analyte in a process sample. This continuous indication can be provided locally by the analyzer and/or remotely to one or more suitable devices in order to provide control and/or monitoring of a chemical process.

One particular type of online wet chemistry analyzer is an online silica analyzer. These devices are configured to generate a reaction in the process sample that allows an indication of silica in the sample to be determined. Such analyzers are useful in determining silica content in boiler water, boiler feedwater, demineralized water, and steam condensate. While such analyzers are useful in a variety of industries, they are of particular use in power plant boilers. In such systems, silica can form silicate deposits that can damage turbines and other generation equipment that is used in the water-steam turbine cycle. Accordingly, power plants with high pressure turbines generally monitor silica carefully in order to ensure effective detection and removal/remediation. One particular example of an online silica analyzer is sold under the trade designation Model CFA3030 Silica Analyzer from Rosemount Analytical, an Emerson Process Management company.

An online silica analyzer will generally employ a known reaction to render the silica in the process sample readily detectable. One example of such a reaction is known as the molybdenum blue method. In the molybdenum blue method, molybdate (usually in the form of potassium molybdate) is used to react with silica in the process sample/solution in order to generate a compound suitable for colorimetric detection. In accordance with the molybdenum blue method, the silica content in water is measured based on the color of the silicomolybdic acid formed through the wet chemistry process. The colorimetric detection in accordance with the molybdenum blue method is governed by the Beer-Lambert law, which states that there is a logarithmic dependence between the transmission (or transmissivity), T, of light through a substance and the product of the absorption coefficient of the substance, α, and the distance that the light travels through the material (i.e. path length), 1. The Beer-Lambert law is expressed as follows:

$$T = \frac{I}{I_o} = 10^{-\alpha l} = 10^{-\epsilon l c}$$

The absorption coefficient can be written as a product of the molar absorptivity (extinction coefficient) of the absorber, ε, and the molar concentration, c, of the absorbing species in the material where, I and $I_o$ are the intensity of the incident light and the transmitted light, respectively.

SUMMARY

A colorimetric wet chemistry analyzer for determining a concentration of an analyte of interest in a sample is provided. The analyzer comprising includes a reaction chamber configured to receive the sample and facilitate a reaction that changes a color of the sample based on the concentration of the analyte of interest. A photometric cell is operably coupled to the reaction chamber to receive the sample and direct illumination therethrough. The photometric cell has a first illumination source configured to provide illumination at a first wavelength through the photometric cell and a second illumination source configured to provide illumination at a second wavelength through the photometric cell. The second wavelength is different than the first wavelength. A photo detector is configured to detect illumination passing through the photometric cell. A controller is coupled to the first illumination source, the second illumination source and the photo detector and is configured to provide an indication of concentration relative to the analyte of interest based on a signal from the photo detector.

DETAILED DESCRIPTION OF ILLUSTRATIVE EMBODIMENTS

Figure 1:
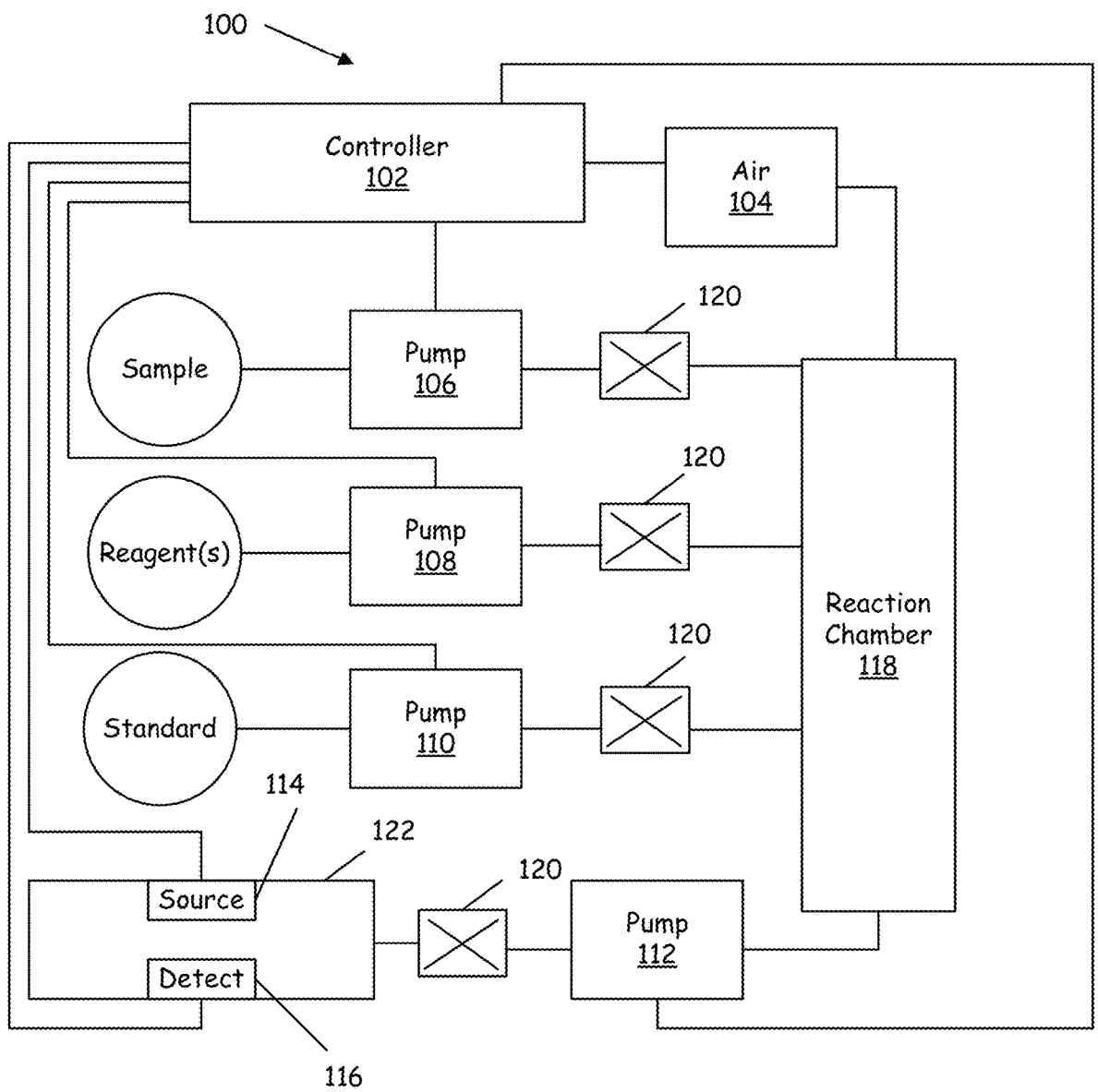
FIG. 1 is a diagrammatic view of an online silica analyzer with which embodiments of the present invention are particularly useful.

FIG. 1 is a diagrammatic view of an online silica analyzer with which embodiments of the present invention are particularly useful. Analyzer 100 includes controller 102 that is coupled to air source 104, pumps 106, 108, 110, and 112. Additionally, controller 102 is also coupled to illumination source 114 and illumination detector 116. Typically, each pump 106, 108, 110, and 112 includes a chemically-inert flexible membrane in a cavity. Cavity volumes are typically 5 mL for sample and standards (pumps 106 and 110) and 0.2 mL for reagents (pump 108). A vacuum/pressure pump (not shown) pushes and pulls on the membrane. Vacuum causes the chamber to fill. Pressure pushed the liquid out of the cavity into reaction chamber 118. A number of check valves 120 are provided in order to prevent backflow. When mixing of the sample/reagent/standards is desired, controller 102 engages air source 104 to pump a quantity of air into reaction chamber 118 in order to mix the contents therein. After a suitable reaction time has passed, the treated sample is pumped, using pump 112, to measurement cell 122. Once the mixed sample is provided within measurement cell 122, controller 102 engages illumination source 114 to direct light through the mixed sample toward detector 116. In accordance with known techniques, the illumination detected by detector 116 provides an indication of the analyte (silica) in the sample. Controller 102 automatically calculates the absorbance and translates the results into a silica concentration reading. Once the measurement is complete, repeated flushes with fresh sample remove the treated sample from the measurement and reaction cells, 122 and 118, respectively.

Based on the molybdenum blue method, the silica content in water is measured by the color of silicomolybdic acid formed through the wet chemistry process, as set forth above. At 810 nm, the absorptivity of the material is about 0.00035/parts per billion. One difficulty for colorimetric analyzers is to provide a significant measurement range with effective resolution. For example, in silica analyzers there is a desire to provide high sensitivity down to 0.5 parts per billion of silica content while still also being able to provide a silica concentration measurement as high has 5 parts per million (ppm). If the incident light is measured with a photodiode having an output of 100 milliamps, then at 5 ppm the transmitted light will only be 0.05 nanoamps, which is too small to measure. While it would be possible to change the analyzer design by providing an additional path having a different length through which the light passes within the mixed sample, the provision of multiple measurement cells in a silica analyzer is not favored.

In accordance with an embodiment of the present invention, a colorimetric analyzer is provided that uses a light source or sources having at least two distinct wavelengths of light. By providing such a plurality of light sources, a single length photometric cell can be used. Light at each wavelength, generally monochromatic such that the light has a single wavelength or extremely narrow band of wavelengths, is used for a different detection range.

Figure 2:
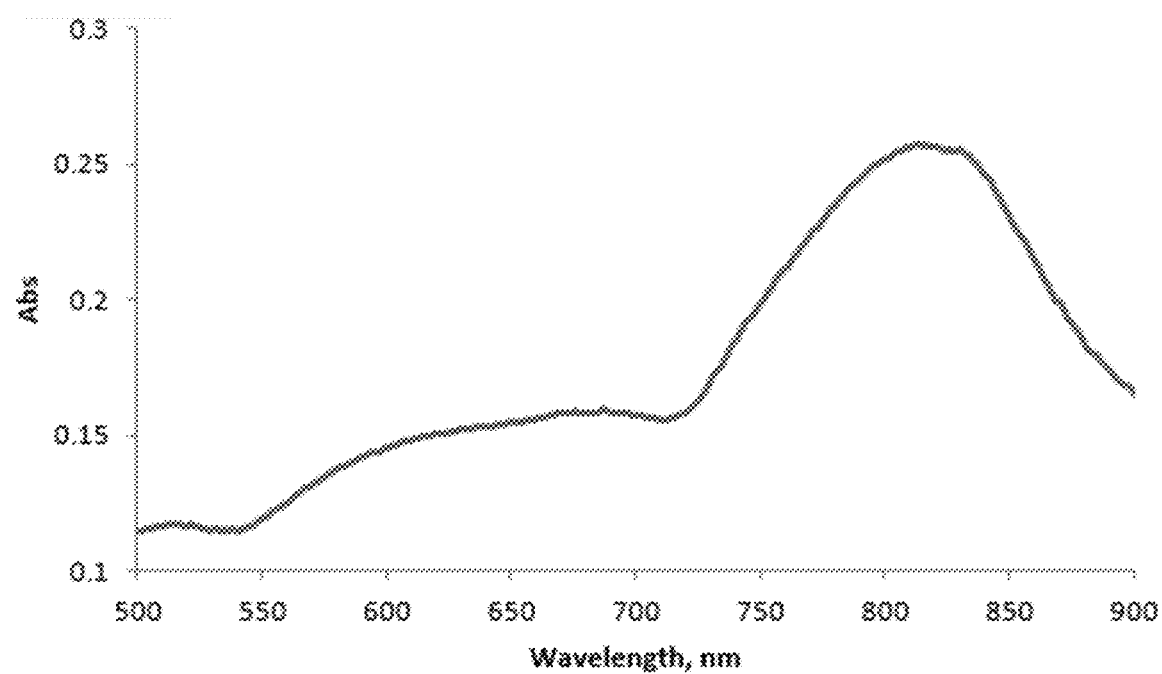
FIG. 2 is a diagrammatic view of a chart of absorption spectrum for silicomolybdic acid.

FIG. 2 is a diagrammatic view of a chart of absorption spectrum for silicomolybdic acid. In the vertical axis, the absorptivity is provided while the wavelength is provided as the horizontal wavelength (in nanometers). As can be seen, silicomolybdic acid has two absorption peaks, one at 810 nm and the other at 670 nm. Also, the absorptivity at 670 nm is approximately two-thirds of that at 810 nm. According to the Beer-Lambert Law, the reduction of absorptivity is equivalent to the reduction of the length of the photometric cell for high concentration measurements. With the reduction of the absorptivity from 0.00035 at 810 nm to 0.00022 at 670 nm, with the same length (such as 3.6 cm) and $I_0$ of 100 milliamps, the current (I) at 5,000 ppm will be approximately 10 nanoamps, which is a value that can be readily measured.

Figure 3:
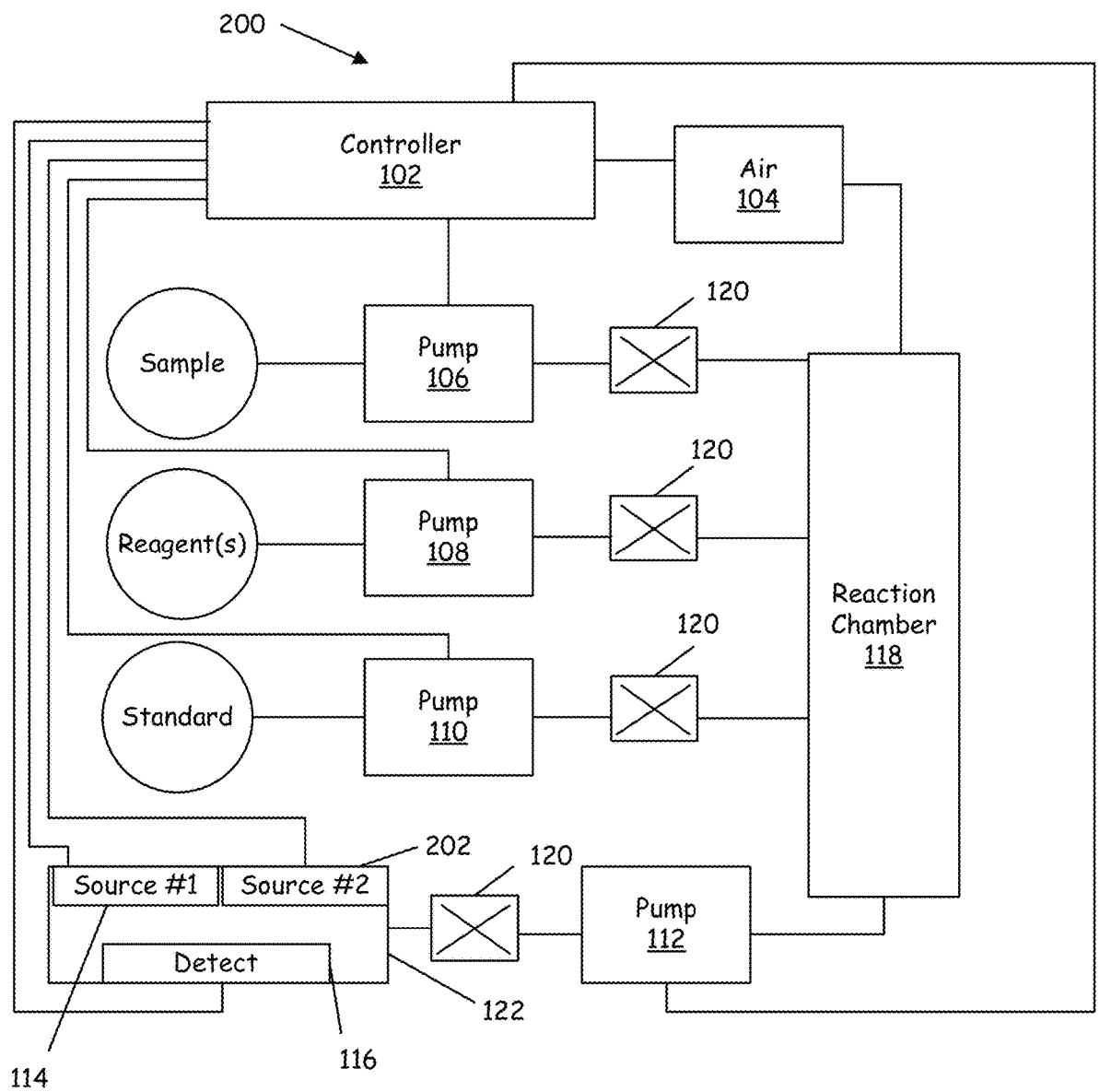
FIG. 3 is a diagrammatic view of an online silica analyzer in accordance with an embodiment of the present invention.

FIG. 3 is a diagrammatic view of an online silica analyzer in accordance with an embodiment of the present invention. Analyzer 200 bears many similarities to analyzer 100, and like components are numbered similarly. The main difference between analyzer 200 and analyzer 100 is that analyzer 200 includes a second illumination source 202 that is also configured to introduce illumination within measurement cell 122. Source 202 provides illumination at a different wavelength than that of source 114. In the illustrated embodiment, source 114 provides illumination at substantially 810 nm while source 202 provides illumination at approximately 670 nm. Accordingly, if the response of detector 116 to illumination from one source is beyond the measurement limits (either too low or too high) the first source 114 can be disengaged and the second source 202 can be engaged in order to detect at a different detection level. For example, source 114 provides illumination at 810 nm. If controller 102 measures the response of detector 116 as being essentially zero current, controller 102 can disengage source 114 and engage source 202 which can provide illumination through measurement cell 122 at 670 nm. Accordingly, the detection limits of analyzer 200 are extended relative to analyzer 100 without requiring multiple measurement cells or cell lengths. While the embodiment illustrated in FIG. 3 illustrates a pair of sources 114, 202, it is expressly contemplated that additional sources can be provided. Additionally, while a single detector 116 is provided that receives illumination passing through the mixed sample within measurement cell 122, embodiments of the present invention can also include a second detector disposed proximate sources 114 and 202 in order to directly measure the intensity of illumination prior to such illumination passing substantially through any of the mixture. In this way, embodiments of the present invention can also increase the energy provided to one or both of sources 114, 202 and directly compare the incident illumination with the amount of illumination that passes through the mixture.

Figure 4:
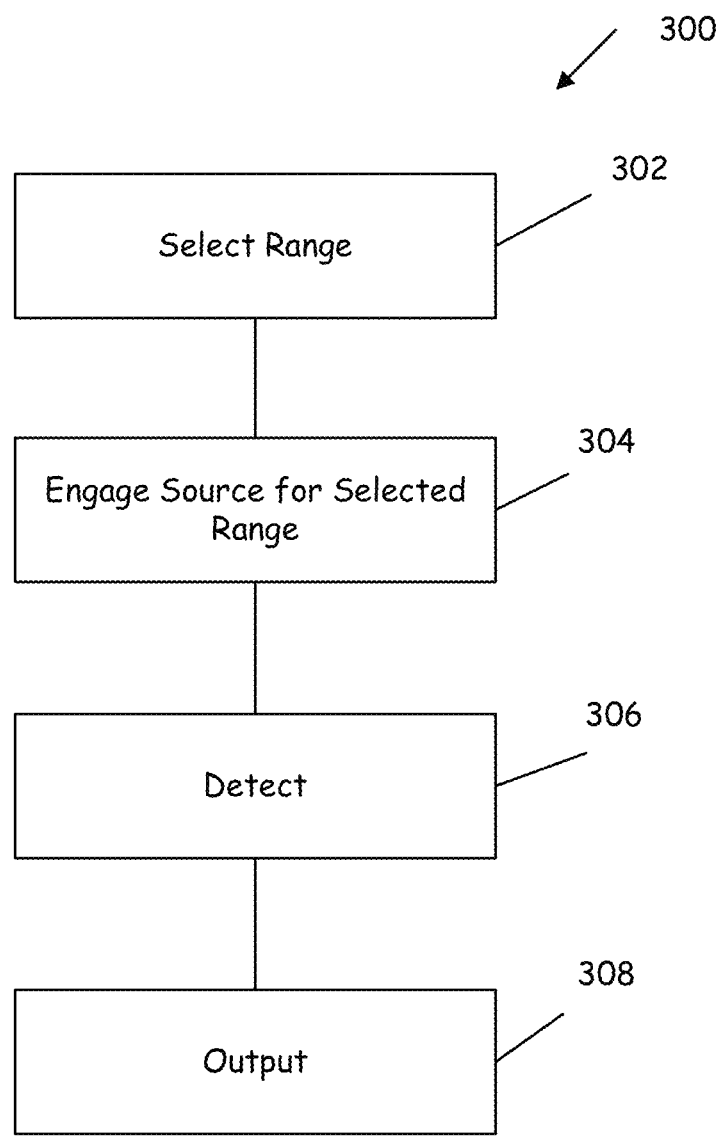
FIG. 4 is a flow diagram of a colorimetric method of measuring silica content in a water sample in accordance with an embodiment of the present invention.

FIG. 4 is a flow diagram of a colorimetric method of measuring silica content in a water sample in accordance with an embodiment of the present invention. Method 300 begins at block 302 where a user or technician selects, using a user interface of the silica analyzer, a detection range of the silica in the water sample. Examples of suitable ranges include 0-50 parts per billion, 0-100 parts per billion, 0-200 parts per billion, 0-250 parts per billion, 0-300 parts per billion, 0-500 parts per billion, 0-1.0 parts per million, 0-2.0 parts per million, 0-2.5 parts per million, 0-5 parts per million, 0-10 parts per million, 0-20 parts per million, 0-30 parts per million, 0-50 parts per million, and 0-100 parts per million. Next, at block 304, the analyzer engages a suitable source based on the range selected at block 302. Once the source is engaged, the analyzer utilizes a detector, such as detector 116, to detect the silica in the water sample, as indicated at block 306 based on the known molybdenum blue method. Next, at block 308, the analyzer provides an indication of the silica measurement determined colorimetrically based on the concentration of the silicomolybdus acid. The output can be provided locally at the silica analyzer and/or communicated over a suitable process communication loop or segment, or both.

Figure 5:
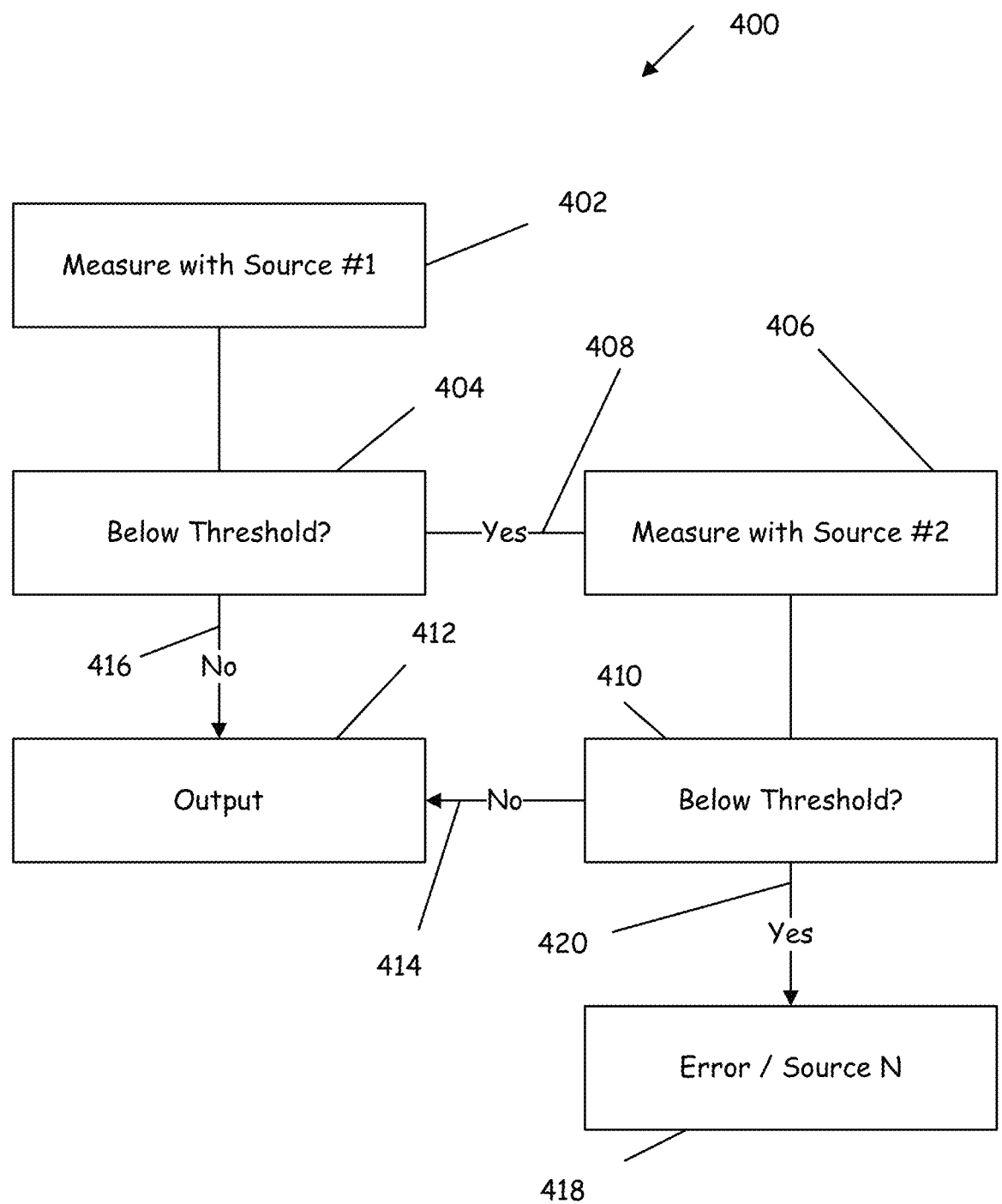
FIG. 5 is a diagrammatic view of a method 400 for automatically ranging a silica measurement in accordance with an embodiment of the present invention.

FIG. 5 is a diagrammatic view of a method 400 for automatically ranging a silica measurement in accordance with an embodiment of the present invention. Method 400 begins at block 402 where a silica analyzer measures a silica content of silica in a water sample in accordance with a colorimetric technique, such as the molybdenum blue method. Next, at block 404, the analyzer determines whether the measured silica content is beyond a threshold. If the measurement obtained at block 404 is not beyond a detectable threshold, control passes to block 412 along line 416, where the analyzer provides the silica output. However, if the detected measurement obtained at block 402 is below a detectable level for the source, control is passed to block 406 along line 408 where the measurement is reattempted using a different source. As set forth above, the different source will have a different wavelength. For example, the first source used relative to block 402 may have light with a wavelength of approximately 810 nm, while the source used at block 406 may have light at approximately 670 nm. Once the second measurement attempt is generated using source 2, at block 406, control passes to block 410 where the analyzer determines whether the measurement is still beyond a detectable threshold. If the measurement is no longer beyond a measurement threshold, control passes to block 412 along block 414 where the measurement is provided either as a local output or remotely over a process communication loop or segment. As indicated in FIG. 5, if the second measurement attempt obtained at block 406 is still beyond a detectable threshold, control passes to block 418 along line 420. In this instance, the analyzer can generate an error indicating that the measurement is beyond any detectable thresholds. Further, in embodiments that provide yet another source, such as a third source (having a wavelength of approximately 460 nm) the method can continue with a third measurement attempt, et cetera.

While embodiments of the present invention have generally been described with respect to a photometric cell for a silica analyzer using the molybdenum blue method, embodiments of the present invention can be applied to other colorimetric analyzers with wavelengths chosen based on the type of material to be detected. Essentially, any time the dynamic range of the colorimetric analyzer is desired to be extended, the absorption spectrum of the particular analyte of interest can be consulted to determine if one or more additional sources can be used to provide enhanced colorimetric detection.

Although the present invention has been described with reference to preferred embodiments, workers skilled in the art will recognize that changes may be made in form and detail without departing from the spirit and scope of the invention.

What is claimed is:

1. A colorimetric wet chemistry analyzer for determining a concentration of silica in a sample, the analyzer comprising:
   a reaction chamber that receives the sample and facilitate a molybdenum blue reaction that changes a color of the sample based on the concentration of silica;
   a photometric cell operably coupled to the reaction chamber to receive the sample and direct illumination therethrough, the photometric cell having a first illumination source that provides illumination at a first wavelength of 810 nanometers through the photometric cell, and a second illumination source that provides illumination at a second wavelength of 670 nanometers through the photometric cell, where the second wavelength is different than the first wavelength;
   a photodetector, within the photometric cell, that detects illumination passing through the photometric cell; and
   a controller coupled to the first illumination source, the second illumination source and the photodetector, wherein the controller is configured to:
   engage the first illumination source;
   receive a first photodetector signal from the photodetector, relative to the first illumination source, while the first illumination source is engaged;
      compare the first photodetector signal received to a selected threshold,
      wherein the second illumination source is engaged based on the first photodetector signal being below the selected threshold;
   receive a second photodetector signal, while the second illumination source is engaged;
   calculate an absorbance based on the received second photodetector signal;
   provide an indication of silica concentration based on the signals received from the photodetector and the absorbance; and
   wherein the second illumination source detects at a different detection level than the first illumination source.

2. The analyzer of claim 1, wherein the first illumination source provides monochromatic illumination.

3. The analyzer of claim 1, wherein the second illumination source provides monochromatic illumination.

4. The analyzer of claim 1, and further comprising a user interface that receives an indication relative to a detection range.

5. The analyzer of claim 4, wherein the controller engages one of the first and second illumination sources based on the detection range.

6. The analyzer of claim 1, wherein the selected threshold comprises a detectable level of current.

7. A colorimetric wet chemistry analyzer for determining a concentration of silica in a sample, the analyzer comprising:
   a reaction chamber that receives the sample and facilitate a molybdenum blue reaction that changes a color of the sample based on the concentration of silica;
   a photometric cell operably coupled to the reaction chamber to receive the sample and direct illumination therethrough, the photometric cell having a first illumination source that provides illumination at a first wavelength of 810 nanometers through the photometric cell, and a second illumination source that provides illumination at a second wavelength of 670 nanometers through the photometric cell, where the second wavelength is different than the first wavelength;
   a photodetector, within the photometric cell, that detects illumination passing through the photometric cell; and
   a controller coupled to the first illumination source, the second illumination source and the photodetector, wherein the controller is configured to:
   engage the first illumination source;
   receive a first photodetector signal from the photodetector, relative to the first illumination source, while the first illumination source is engaged;
   compare the first photodetector signal to a selected threshold of 0.05 nanoamps;
   engage the second illumination source, based on a detection that the first photodetector signal is below the selected threshold, wherein the second illumination source detects at a different detection level than the first illumination source;
   receive a second photodetector signal, while the second illumination source is engaged;
   calculate an absorbance based on, the received second photodetector signal; and
   provide an indication of silica concentration based on the signals received from the photodetector and the absorbance.

* * * * *

UNITED STATES PATENT AND TRADEMARK OFFICE
CERTIFICATE OF CORRECTION

PATENT NO. : 10,788,416 B2
APPLICATION NO. : 14/502425
DATED : September 29, 2020
INVENTOR(S) : Bradley A. Butcher and Chang-Dong Feng It is certified that error appears in the above-identified patent and that said Letters Patent is hereby corrected as shown below:

In the Claims

Column 6, Line 49, Claim 7, delete "," after "based on"

Signed and Sealed this
Eighth Day of November, 2022

*Katherine Kelly Vidal*
Katherine Kelly Vidal
*Director of the United States Patent and Trademark Office*